United States Patent [19]

Lofredo

[11] 4,012,490
[45] Mar. 15, 1977

[54] REMOVING RADIOACTIVE NOBLE GASES FROM NUCLEAR PROCESS OFF-GASES

[75] Inventor: Antony Lofredo, Springfield, N.J.

[73] Assignee: Airco, Inc., Montvale, N.J.

[22] Filed: Oct. 7, 1974

[21] Appl. No.: 512,657

Related U.S. Application Data

[63] Continuation-in-part of Ser. No. 275,017, July 25, 1972, abandoned.

[52] U.S. Cl. .................. 423/262; 423/219; 423/230; 55/68; 55/75; 62/11; 62/18; 62/22; 176/37

[51] Int. Cl.² .................. C01B 23/00; F25J 3/00; G21F 9/02

[58] Field of Search .......... 423/210, 219, 230, 262; 55/68, 75; 62/11, 18, 22; 176/37

[56] References Cited

UNITED STATES PATENTS

| 3,074,776 | 1/1963 | Ryan et al. | 423/262 |
|---|---|---|---|
| 3,166,478 | 1/1965 | Lindstrom | 176/37 |
| 3,193,393 | 6/1965 | Dennis | 62/22 |
| 3,203,866 | 8/1965 | Lehmer et al. | 176/37 |
| 3,226,914 | 1/1966 | Griesmer et al. | 55/75 X |
| 3,404,067 | 10/1968 | Rendos | 176/37 |
| 3,501,923 | 3/1970 | Lehmer | 62/22 |
| 3,609,983 | 10/1971 | Lofredo et al. | 62/22 |
| 3,748,864 | 7/1973 | Lofredo et al. | 62/11 X |
| 3,806,583 | 4/1974 | Dewell | 423/262 |
| 3,871,842 | 3/1975 | Quieser et al. | 176/37 |

FOREIGN PATENTS OR APPLICATIONS

| 812,397 | 4/1959 | United Kingdom | 55/75 |

*Primary Examiner*—Oscar R. Vertiz
*Assistant Examiner*—Brian E. Hearn
*Attorney, Agent, or Firm*—David L. Rae; H. Hume Mathews; Edmund W. Bopp

[57] ABSTRACT

A system for separating, concentrating and storing radioactive krypton and xenon in the off-gases from a boiling water reactor, wherein adsorption and cryogenic distillation are both efficiently used for rapid and positive separation and removal of the radioactive noble gases, and for limiting such gases in circulation in the system to low inventory at all times, and wherein the system is self-regulating to eliminate operator options or attention.

19 Claims, 7 Drawing Figures

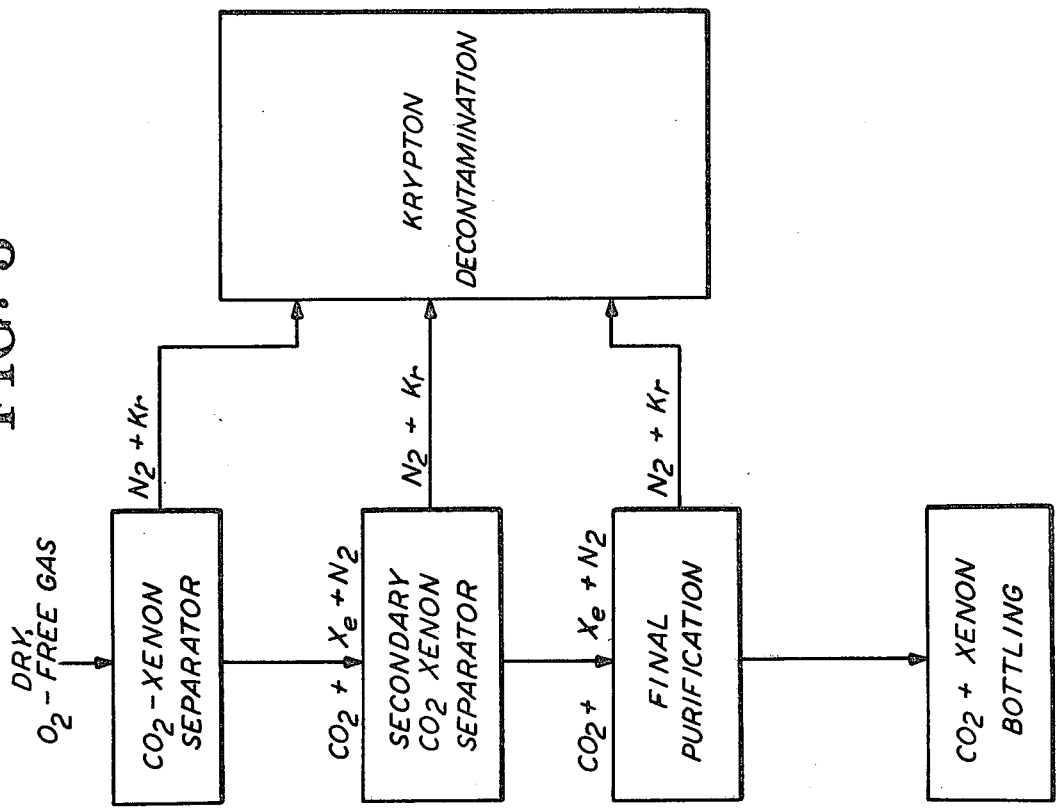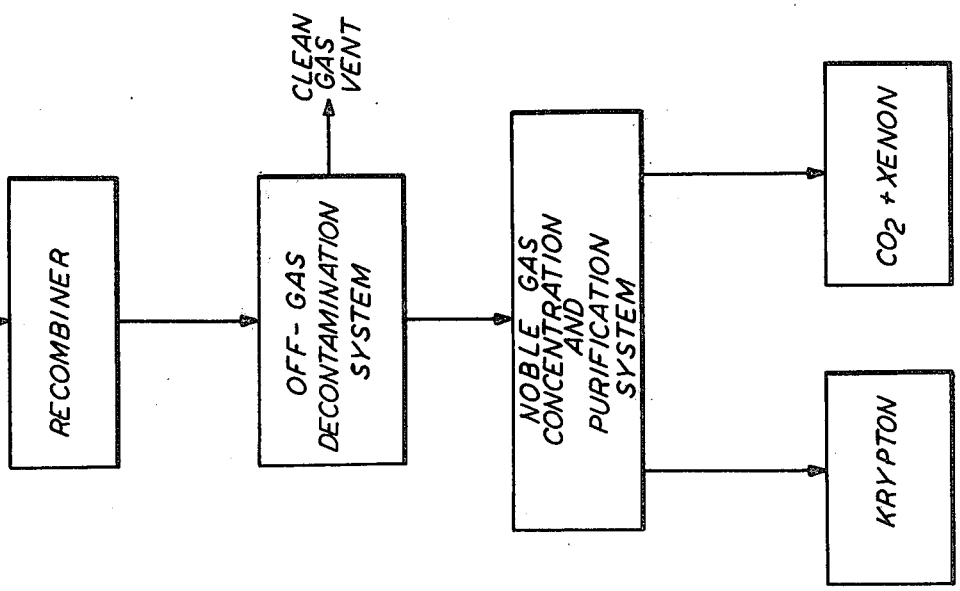

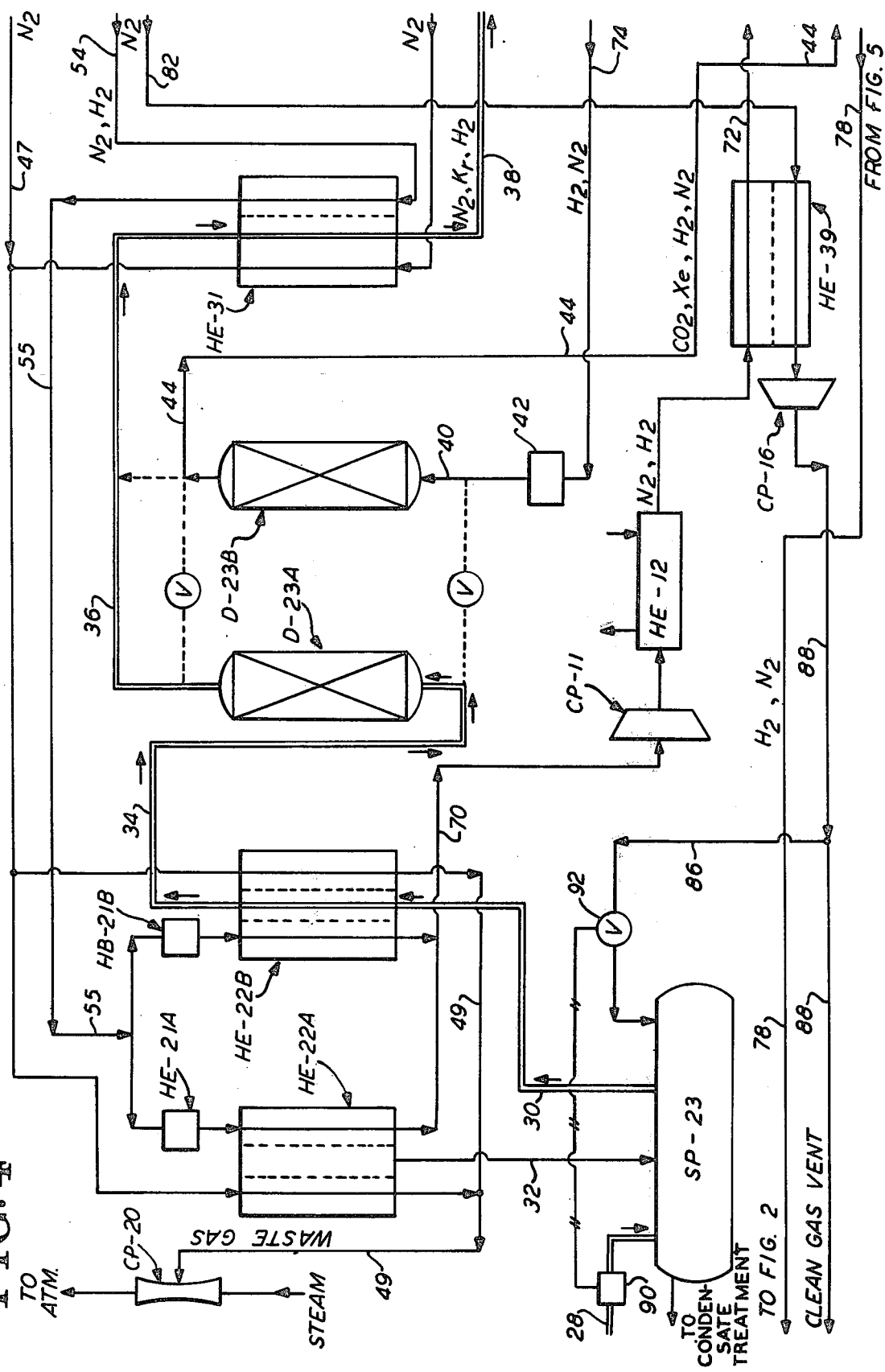

REMOVING RADIOACTIVE NOBLE GASES FROM NUCLEAR PROCESS OFF-GASES

CROSS REFERENCE TO RELATED APPLICATION

This application is a Continuation-in-Part of my application Ser. No. 275,017, filed July 25, 1972 for "System for Removing Radioactive Noble Elements from Nuclear Reactor Off-Gases", now abandoned.

BACKGROUND OF THE INVENTION

In various nuclear processes such as nuclear power generation utilizing boiling water reactors (BWR), the possibility of environmental radiation hazards are continually presented. For example, where the turbine leakage air, etc. that enters the steam condenser of a typical system is subsequently vented therefrom as "off-gas" to atmosphere, radiation hazards clearly exist. That is, air in leakage into the condenser and turbine will sweep with it radioactive krypton and xenon fission products that are released by leakage from reactor fuel elements. The contaminated leakage air constituting the off-gas cannot therefore be safely vented to atmosphere. In another application, such as nuclear-fuel reprocessing plants, fuel elements are processed and dissolved for recycling and fission products including radioactive krypton and xenon which are of primary concern here, are released to constitute together with air or other carrier such as nitrogen or argon generated by other nuclear processes, the off-gas stream. In both instances, the radioactive fission products described above cannot be vented directly to atmosphere because of radiation hazard and therefore must be isolated or stored for a required period so as to be rendered harmless.

A number of different systems for removing radioactive contaminants from reactor and other nuclear process off-gases have been proposed; in general, these systems require continuous monitoring by station personnel, are complicated and expensive, and in some instances impractical for long range operation. For example, systems using adsorbers, solvent baths, etc. have been proposed for capturing and separating the radioactive gases from the off-gas stream. None of these systems has efficiently and economically achieved rapid separation, concentration and compact system storage of the radioactive krypton and xenon in the off-gas streams; nor are the prior art systems capable of maintaining completely safe isolation of the longer lived radioactive krypton from the environment.

The present invention is concerned with providing an improved and simplified system for safely isolating radioactive noble gases from the environment and is applicable to systems for removing krypton and xenon from air, argon, nitrogen, $CH_4$, CO and mixtures thereof as applied to nuclear power plants of the boiling water reactor, pressurized water reactor, fast flux and breeder reactor types or any other reactors that generate the above gas mixtures. In addition, the present invention is applicable to the treatment of off-gases such as the foregoing mixtures developed by nuclear fuel processing, reprocessing and manufacturing operations,

SUMMARY OF THE INVENTION

In accordance with the invention as disclosed, the off-gas from nuclear systems such as a boiling water reactor which is mainly air, is passed first through a so-called recombiner stage wherein the oxygen and ozone and nitrogen oxides that may be formed in the radiation field react with added hydrogen to form water, etc. that are easily removed from the gas stream such as by condensation. The resulting oxygen-free stream from the recombiner composed in general of nitrogen, water, hydrogen, carbon dioxide, krypton and xenon including radioactive isotopes, and trace impurities, is dried and then passed through adsorbers for removing both carbon dioxide ($CO_2$) and the xenon (Xe), these two gases being subsequently removed from the adsorbers, separated and collected. The gas stream now free of $CO_2$ and Xe, is cooled to low temperature and passed for cryogenic distillation to a primary separation column, the krypton (Kr) with some nitrogen being concentrated as condensate at the bottom of the column. The effluent gas from the column, essentially nitrogen ($N_2$) and hydrogen ($H_2$), is advantageously used for system cooling and to elute and remove the $CO_2$ and Xe from the adsorbers above. The condensate is fed to one of two monitor tanks for temporary storage, the second tank from a previous filling meanwhile feeding a batch still (secondary separation column) which further concentrates the krypton and returns the now "clean" gas to the first column.

By this method, the long-lived krypton is concentrated to a small volume and held in the system where it presents no hazard to the environment. The eluted Xe and $CO_2$ from the off-stream adsorber are deposited in a freeze-out heat exchanger and later restored to vapor phase by sublimation. The combined gases are then fed to a batch still where they are finally decontaminated of residual traces of krypton, then compressed and bottled for storage and eventual venting after decay of radioactive xenon, or for further commercial use.

A principal object of this invention therefore is to provide an improved and simplified system for efficiently and safely receiving, separating, concentrating and storing radioactive noble gases such as krypton and xenon that are included in the off-gas from nuclear systems such as boiling water nuclear reactors and processes involving the manufacture, use, or reprocessing of nuclear fuel.

Another object is to provide an improved system of the character above, that is self-regulating for unattended, safe and continuous operation, and that has means for holding within the system highly concentrated radioactive gases after separation from the off-gas.

Another object is to provide in the system above, dual function cryogenic distillation means having high krypton decontamination and back-up safety factors for preventing return of radioactive krypton into decontaminated circuits.

Another and related object is to provide an improved system of the character above having adsorber and freeze-out circuits related to the cryogenic distillation means for ensuring prompt, high concentration of krypton and xenon with high gain, favorable disposal economics, and low inventory of radioactive gas in the cryogenic processing section at all times.

Other objects, features and advantages will appear from the following description with reference to the accompanying drawings.

BRIEF DESCRIPTION OF DRAWINGS

FIG. 1 is a generalized schematic illustration of the off-gas receiving and processing sections of the system embodying the present invention;

FIG. 3 is a generalized schematic illustration of carbon dioxide-xenon separation and nitrogen-krypton separation respectively, after passage of the process gas stream from the recombiner section;

FIGS. 4 and 5 form together with FIG. 2 detailed flow diagrams of the separating, decontaminating and storage sections of the overall system.

DESCRIPTION OF PREFERRED EMBODIMENT

Referring briefly to the generalized schematic of FIG. 1, the invention essentially comprises as labeled, three major sub-systems, namely:

1. A "RECOMBINER" which receives the reactor off-gas and wherein hydrogen ($H_2$) and oxygen ($O_2$) and the like, including radiolytic oxygen and hydrogen are removed by catalytic reaction. Hydrogen is added to react wtih the elemental $O_2$ component of air in the feed stream;
2. An "OFF-GAS DECONTAMINATION SYSTEM" wherein $CO_2$, water and higher hydrocarbons are removed by condensation for precluding degradation of system performance, and wherein xenon (Xe) and krypton (Kr) are separated from the process stream by adsorption and cryogenic distillation techniques, respectively, and:
3. A "NOBLE GAS CONCENTRATION AND PURIFICATION SYSTEM" for concentrating the krypton and xenon, and for producing highly decontaminated vent gas. As indicated, the krypton is separately concentrated and stored, whereas the Xe and $CO_2$, which together are removed from the process stream by adsorption in the decontamination system, are subsequently recovered, concentrated and stored together.

Figure 2:
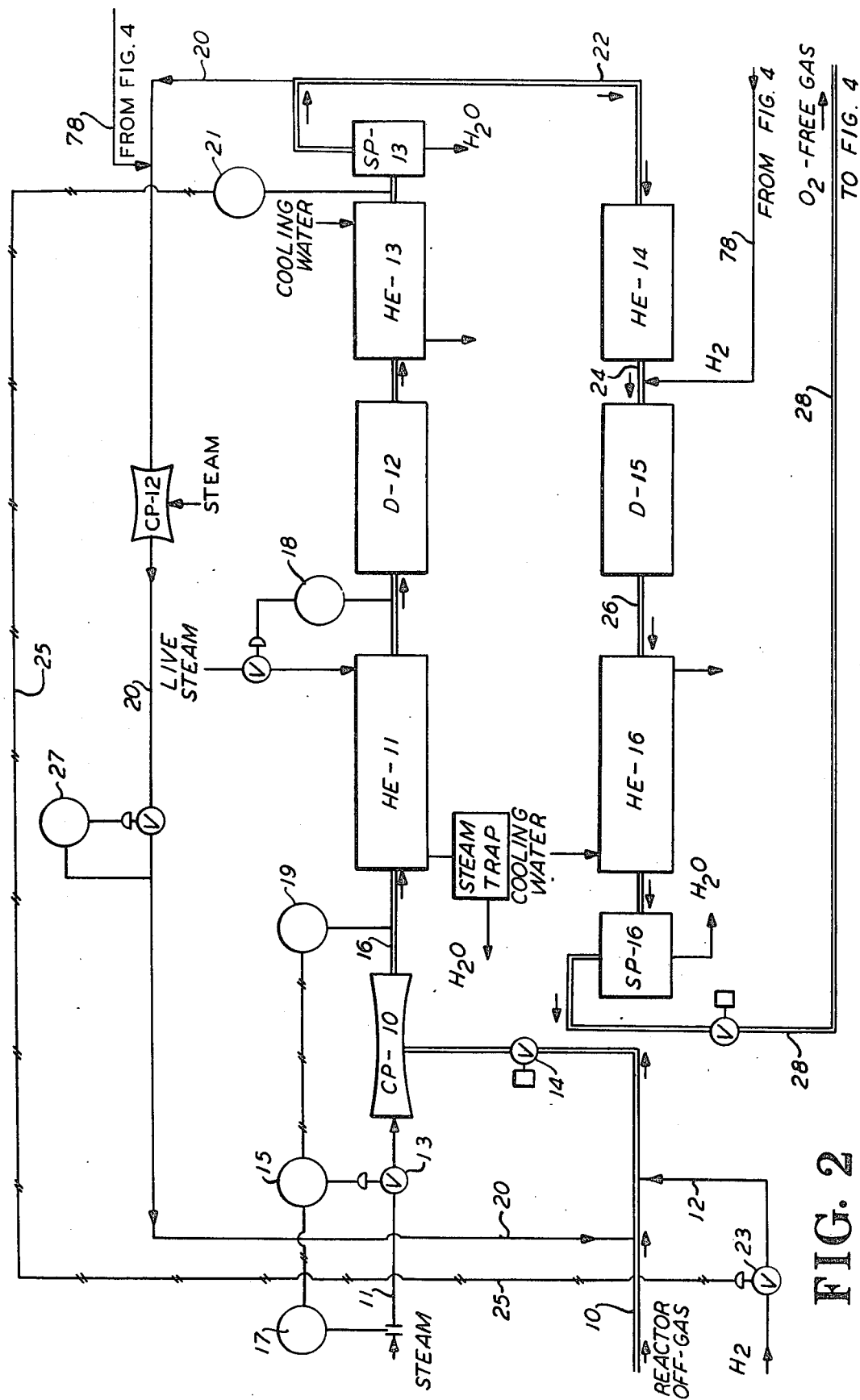
FIG. 2 is a detailed flow diagram of the recombiner section indicated in FIG. 1.

The recombiner sub-system shown more specifically by the flow diagram of FIG. 2, is primarily for the purpose of converting elemental hydrogen and oxygen to water in order to remove these elements. The incoming process stream of reactor off-gas in line 10 which, for example, may be produced by a nuclear power generation process typically of the boiling water reactor type, in general consists of moisture-saturated air, hydrogen, oxygen, krypton and xenon. The air normally includes some carbon dioxide, hydrocarbons and rare gases including krypton and xenon. Additional radioactive krypton and xenon constitute fission products from the reactor. Where the off-gas stream is from nuclear fuel reprocessing, its composition is substantially the same, except that oxides of nitrogen may also be included together with more krypton and xenon than from the boiling water reactor. The composition of the off-gas stream is predominately air, with the radioactive gases taken together constituting but a very small fraction of 1% of the stream.

The process stream from line 10 is combined with an added supply of $H_2$ from line 12 and fed through a control valve 14 to a steam-jet type compressor CP-10. The gas stream pressure is thereby increased and the mixture of reactor off-gas and hydrogen is diluted by the steam and recycled process gas so that the outlet mixture in line 16 is below explosive limits. The steam supply in line 11 to the jet is automatically regulated by a valve 13 that in turn is adjusted by an automatic control unit 15. This unit is responsive to a signal from a rate transmitter 17 in line 11 representing the steam flow rate, and may also be responsive to a signal from an analyzer transmitter 19 at the jet outlet representing the oxygen content in process stream 16.

In the recombiner, reactions are catalyzed to convert any ozone, oxides of nitrogen, methane and anticipated higher hydrocarbons to forms that can be readily removed from the gas stream. Hydrocarbons generally are converted to $CO_2$ and water, although small amounts of methane may remain and be carried through the system for collection with the separated krypton without significant effect.

This process stream of combined off-gas, hydrogen and steam is fed to a primary recombiner system comprising a heat exchanger (HE) functioning as a preheater HE-11, wherein the temperature of the mixture is increased to provide superheat, typically between 350° and 450° F. The mixture temperature may be controlled by a temperature sensing device 18 that controls a valve as indicated, in the incoming livestream line of the preheater. The heated stream is then subjected to catalytic reaction in a primary recombiner or "de-oxo" unit D-12, wherein water is formed in known manner by reaction of hydrogen and oxygen in the presence of a suitable catalyst for essentially eliminating the oxygen in the stream. In the reaction, hydrogen combines with oxygen in the presence of the catalyst to form easily removable water. The catalyst is ordinarily a noble metal, such as platinum or palladium on an inert substrate. It has been found, for example, that oxides of nitrogen in the off-gas from nuclear fuel reprocessing while not radioactive, are preferably removed for more efficient mechanical functioning of the cryogenic system of the invention. For also reducing these oxides in the recombiner unit, a suitable catalyst such as rhodium can be used as indicated above in an additional catalytic bed. The recombiner catalytic units per se which are commonly referred to in the trade as "de-oxo" units, are ordinarily purchased as such in the commercial market.

The water-laden hot stream from the recombiner unit D-12 then flows through a condenser comprising a water-cooled heat exchanger HE-13 and a water separator SP-13 to remove the major part of the water from the stream. For controlling the reaction hydrogen fed to the recombiner system in line 12, the outlet of the condenser HE-13 can be connected to a hydrogen analyzer and control unit 21 for suitably regulating the hydrogen inlet valve 23 through a control signal line 25.

The outgoing stream from separator SP-13 is divided, one part being recirculated through line 20 to the incoming off-gas line 10. The line 20 includes a steam-jet compressor CP-12 and a pressure-responsive control device 27 for regulating a recirculation valve as indicated, to maintain flow and permit control of the hydrogen concentration. The other part of the stream flows in line 22 to a secondary recombiner system operating generally similar to the primary recombiner system described above, to reduce any residual $O_2$ content. The secondary system comprises a recombiner preheater HE-14 from which the heated stream flows to the input line 24 of a secondary recombiner or de- As indicated above, the eluting stream from adsorber D-23A now comprises a mixture of $N_2$, $H_2$, $CO_2$ and Xe. This mixture passes through the outlet line 44 to the liquid nitrogen (LQN) cooled condenser HE-411 (Column C-41) where freeze-out of the $CO_2$ and Xe occurs as the mixture flows upward into the condenser coils. The remaining stream of $N_2$ and $H_2$ flows through the condenser and from the top of the column to line 48, and by way of valve 76 and line 78 to the primary recombiner, FIG. 2, where it supplies added hydrogen for the catalytic reaction previously described.

The adsorber eluting stream in brief, originates in the pressurized reboiler RB-321 after liquefying most of the $N_2$ and using the hydrogen-rich vapor stream (line 74) for eluting the off-stream adsorber D-23B (FIG. 4). The eluting stream transfers the $CO_2$ and Xe to the freeze-out condenser in column C-41, from which the hydrogen-rich effluent is circulated back to the recombiner, FIG. 2, for use in the primary reaction process. The separated LQN above, is held in the nitrogen delay tank (SP-323) a sufficient time for decay of $N_2$ isotopes to an insignificant level and is then vented as clean gas.

When the $CO_2$ and Xe from adsorber D-23B have been transferred to the freeze-out coils of condenser HE-411, valve 77 in line 44 is closed. The condenser HE-411 is now warmed by increasing $N_2$ vapor flow from a shunt line having a heater 49. The resulting vaporization of the frozen $CO_2$ and Xe with pressure increase, causes condensation of the $CO_2$ and Xe at the bottom 50 of the column C-41 in preparation for further concentration and separation. Any small amounts of krypton and nitrogen entrained in the $CO_2$-Xe mixture will be carried along to the final purification stage where they will be separated from the $CO_2$-Xe mixture and retained in the system.

The cryogenic distillation column C-41 operated in a batch mode provides for the final stage of the $CO_2$ processing to produce gas containing a minimum amount of Kr. The distillate from this column which may contain traces of krypton and xenon carried by nitrogen is returned to the recombiner and reprocessed through the entire process to collect the noble gas traces. As contrasted with a continuous $CO_2$ purification method, the batch mode of operation at this stage provides means for capturing small traces of Kr in each $CO_2$ batch from the respective off-stream adsorber. Distillation proceeds as the ascending gas mixture flows into the heat transfer tubes of the condenser HE-411 where it is chilled by cold nitrogen in the condenser shell.

A supply of LQN in tank T-10 is connected by line 46 to the condenser HE-411, as well as by line 45 to other units of the system including the condensers HE-401 of the secondary column C-40 and the condenser HE-323 of the primary column C-32. The exhaust nitrogen from condensers HE-411 and HE-401 and the freeze-out exchanger HE-31 (via condenser HE-323) is collected in a trunk-line 47 for cooling the warm feed exchangers HE-22A and B, FIG. 4, from which the nitrogen passes as clean waste gas to the exhaust line 49 and steam jet CP-20 for venting to atmosphere.

The residual krypton and nitrogen carried along by the xenon are distilled over and pass from the top of the column in lines 48 and 78 as a small part of the feed recycle stream in the recombiner. The $CO_2$ and practically all the Xe are liquefied and collect at the bottom of the batch still C-41 at 50. A small quantity of Xe will also be distilled into the krypton column C-40 and will eventually collect with the krypton concentrate as an impurity. Allowing some small amount of xenon to distill with the krypton ensures maximum decontamination of the $CO_2$ because final traces of more volatile krypton and nitrogen will tend to be carried over with the xenon.

The remaining $CO_2$-Xe mixture in the still is drawn off, warmed and compressed at CP-42 into pressure cylinders as at 52, for further disposition or short term storage. Following about four weeks' storage, the mixture may be vented to atmosphere as the radioactivity of the Xe will have decayed and the residual Kr activity will be minimal. Alternately, final purification of $CO_2$-Xe may be performed following storage rather than preceding such storage.

KRYPTON DECONTAMINATION AND CONCENTRATION

The krypton "decontamination factor" expressed as $$DF = \frac{\text{Kr concentration in feed gas}}{\text{Kr concentration in vent gas}},$$

is a measure of the efficiency of the radioactive separation and isolation process. It has been found in tests using a full scale primary concentration column according to the invention, and simulating normal operation at anticipated flow rates in a boiling water reactor for a utility plant, that DF values greater than $10^6$ were achieved, which values are substantially above present industrial standards.

Referring to FIG. 4, the residual gas stream in line 36 from the adsorber D-23A consisting mainly of nitrogen, hydrogen and krypton, after passing through the freeze-out exchanger HE-31 is cooled to about $-292°$ F. Any remaining condensibles in the stream are frozen out at this temperature so that the process stream in the outlet line 38 now consists of $N_2$, Kr, and $H_2$. This cooled stream entering the bottom of the lower packed section of the primary separation column C-32 tends to flow upward in counterflow to descending refluxed LQN. The required refrigeration for reflux action is provided by the LQN cooled condenser HE-322 at the top of the column. The more volatile hydrogen, and the nitrogen for the most part, pass upward through the packed sections 57 and 59 and condenser HE-322, and are effluent at the top of the column to outlet line 54 as highly decontaminated clean gas. The less volatile krypton is condensed and collected with nitrogen at the bottom of the column at 56. The cold decontaminated gas in outlet line 54 provides refrigeration on the clean side of the system and can be recirculated to regulate and maintain constant flow in the system as described below.

Figure 5:
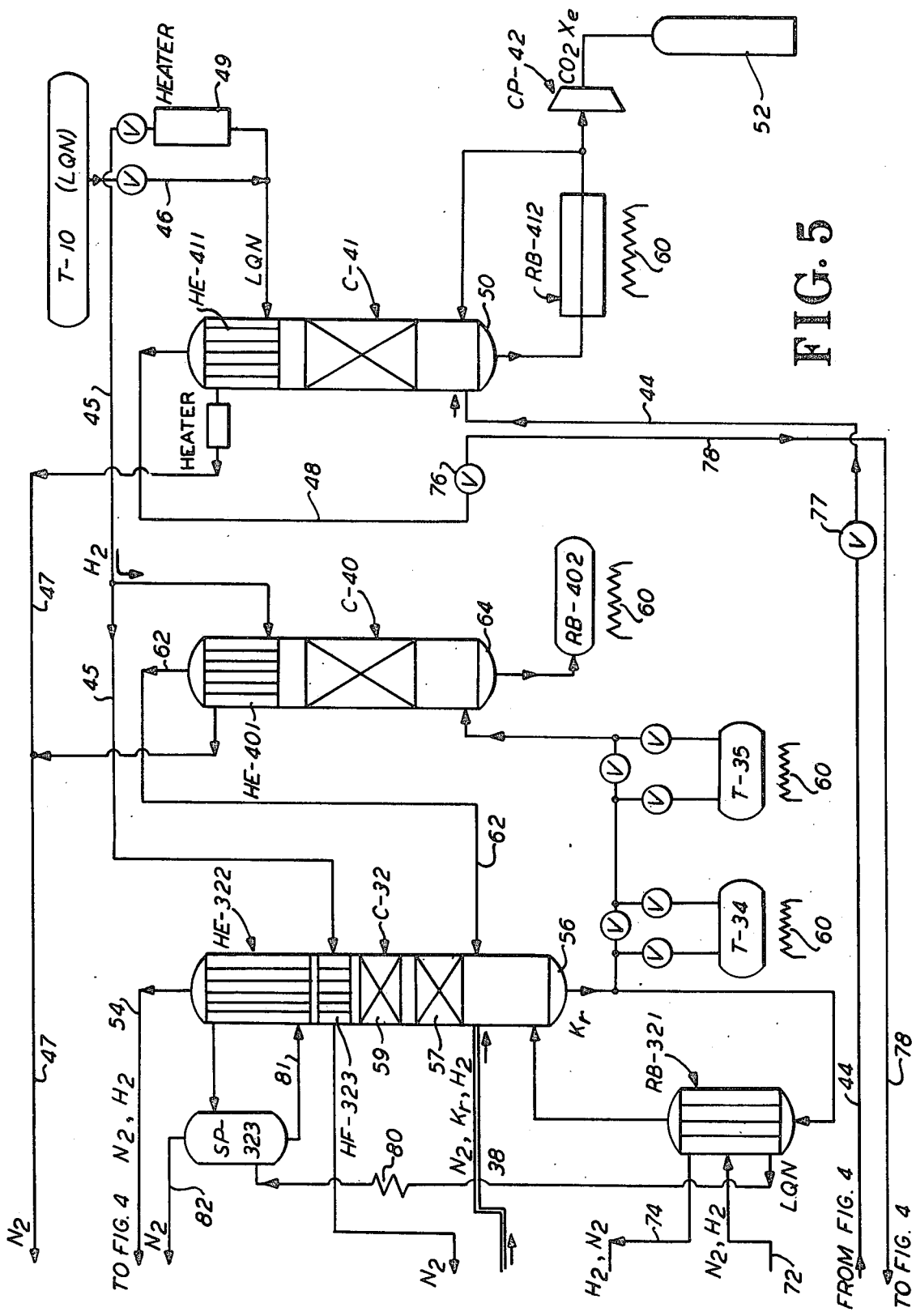

The two packed sections 57 and 59 of the separation column C-32 constitute an important feature of the invention. The lower section 57 is actually sufficient in itself to achieve satisfactory separation of krypton from the remainder of the stream. The upper section 59 which ordinarily receives only clean vapor from the lower section, also would serve to separate and collect any noble gases reaching it. Accordingly, the upper section can function in a dual capacity, not only as a backup standard for normal operation, but also as an adsorber bed or a guard in the unlikely event of a serious column malfunction. For such an improbable contingency the adsorber bed is sized to retain all the enoxo unit D-15. Catalytic reaction in the secondary recombiner further reduces oxygen in the stream to a negligible amount at the recombiner outlet 26, i.e., to a level of parts per billion. Removal of water by the water-cooled condenser HE-16 and water separator SP-16 completes the recombiner processing. The oxygen-free gas stream in the recombiner outlet line 28 is now ready for noble gas separation, etc, in the cryogenic separation and decontamination system, an exemplary embodiment of which is illustrated in FIGS. 4 and 5.

Referring first to the generalized schematic of FIG. 3, the incoming oxygen-free stream is fed to a primary separating system "$CO_2$-XENON SEPARATOR" wherein $CO_2$ and xenon are separated from krypton and nitrogen and is followed up by a secondary separating process at "SECONDARY $CO_2$-Xe SEPARATOR". Residual traces of krypton are recovered from the $CO_2$-Xe mixture at the stage "FINAL PURIFICATION" by cryogenic distillation and the process stream is now reduced to concentrated $CO_2$ and Xe. This mixture is bottled for storage, etc, and decay. The concentrated krypton (with some nitrogen) is concentrated and stored for as long as required. As the Xe isotopes are all short-lived, they may be released along with $CO_2$ after a suitable decay period, thereby minimizing long-term Xe storage requirements.

Returning briefly to FIG. 2, the outlet line 28 for the oxygen-free process stream is shown as the inlet line for the separating system of FIG. 4. The feed stream in line 28 of FIG. 4 is first passed through a water separator SP-23 and then by line 30 to one of a pair of warm feed exchangers HE-22A and HE-22B, where the remaining water is removed. The exchangers HE-22A and HE-22B are identical and are alternated in service, one for an on-stream condensing operation and the other for off-stream de-icing, as controlled by an automatic timer. The changeover is made by switching valves having the best possible sealing capability. In any event, no leakage of radioactive gas into a decontaminated stream would occur as the valve switching is only from contaminated stream to contaminated stream and from decontaminated to decontaminated stream.

The water vapor in the feed stream as it enters the shell side of the exchanger HE-22B and rises toward the cold end, is cooled by cold process gas as described later. The condensate collects at the lower warm end of the exchanger where it flows by gravity back into the separator tank SP-23. The drain line 32 is shown, for example, at the off-stream exchanger HE-22A. The temperature of the resulting cooled and dried gas stream at the exchanger outlet line 34 is about $-95°$ F.

At this stage the process gas stream at the exchanger outlet line 34 consists principally of Xe, $CO_2$, Kr, $H_2$, nitrogen ($N_2$). The $CO_2$ together with the bulk of the Xe is next removed from the stream by the adsorbers D-23A and D-23B. The adsorbers have refrigerated adsorber beds as described later, and are connected for alternate on-stream operation, the off-stream unit meanwhile undergoing eluting or purging of the adsorbed gases. As shown, adsorber D-23A is connected on-stream so that both $CO_2$ and Xe are removed from the stream in the adsorber bed; accordingly, the outlet stream in line 36 now is composed mainly of $N_2$, $H_2$ and Kr which pass freely through the bed. The noble gas stream is thus divided at this point, the Xe together with $CO_2$ being retained in the adsorber, and the Kr together with $N_2$ and $H_2$ continuing in the process stream to Kr decontamination process hereinafter described. The procedure for $CO_2$-Xe separation and purification will first be described.

The two adsorber beds at D-23A and B are operated on an alternating cycle, generally in the manner of the warm feed exchangers. Each bed has adsorbent capacity compatible with maximum $CO_2$ concentration at maximum anticipated flow. As one bed, initially clean and refrigerated, is put into service to collect $CO_2$ and Xe from the cooled process stream now flowing therethrough, the $CO_2$ and Xe mixture previously collected on the other adsorber bed is removed by an eluting stream for further purification. The adsorbent beds are composed of a suitable adsorbent material of known characteristics such as a molecular sieve, and are operated under known conditions to adsorb $CO_2$ and Xe while passing the remainder of the stream consisting mainly of more volatile Kr, $N_2$ and $H_2$. Such selective adsorption is a common technique in the cryogenic gas separation art. As the boiling points of xenon and krypton are $-169°$ and $-245°$ F, respectively, a molecular sieve for example, is operated at a suitable temperature such as about $-100°$ F, where xenon is adsorbed along with the more readily adsorbed $CO_2$ that has a boiling point of $-108°$ F. The more volatile krypton, nitrogen and hydrogen pass through the adsorber as part of the remaining process stream. The adsorbent materials available for this purpose and the pertinent characteristics thereof are well known in the art and include molecular sieve (artificial zeolites), silica gel, alumina, and the like, and are readily available commercially.

For example, where molecular sieve is used, the pore size is selected according to the critical diameters of the gas molecules to be adsorbed. One well-known source of molecular sieve is Union Carbide Corporation, Linde Division, which markets a suitable product for this purpose, namely "Linde Molecular Sieve Type 13X".

In another example, silica gel may be used for the adsorber and when refrigerated as described herein, also functions to remove both $CO_2$ and Xe from the gas stream.

The remainder of the process stream exits the adsorber via outlet line 36 and passes through the cold exchanger HE-31 and outlet line 38 to the primary separation distillation column C-32, FIG. 5, as hereinafter described. Any $N_2$ and/or Kr occluded in the adsorbent bed, as at D-23A, will be recovered in the next stage of the process and will be recycled to preclude release of any radioactive gas.

For simplicity of description, the usual alternate service switch-over connections and valving are in general omitted, the adsorber D-23A being shown on-stream as described above. The off-stream adsorber D-23B is indicated as connected to the elution and transfer lines for removing from the adsorber bed collected $CO_2$ and Xe for further purification and concentration, and for restoring the adsorber to on-stream operating condition. When the adsorber D-23B becomes loaded and is switched off-stream, it is connected at its lower end to an incoming line 40 with a heater unit 42 for directing a stream of clean $H_2$ and $N_2$ gas upward through the contaminated bed to the adsorber outlet line 44 for removing the $CO_2$ and Xe gases by elution. After the bed has been cleaned of adsorbed gases by the warm eluting stream, the heater 42 is turned off and cold nitrogen gas is directed through the bed to refrigerate it for the next on-stream cycle.

tering krypton which would be released within an appropriate time period. The bed is inherently self-cleaning by the continuous reflux of LQN maintained by the condenser HE-322, following any upset in operation. Accordingly, the nonadsorptive lower packed section 57 which consists of conventional packing, and the adsorber bed of the adsorptive upper section 59 which consists of a suitable adsorbent for krypton such as a molecular sieve, function respectively, to condense and separate by reflux action the krypton from the effluent gas, and to provide a back-up standard and krypton guard to adsorb and prevent escape of krypton portions or traces with effluent from the primary column even during time of change or transients in the column operation.

In addition to the example described above of isolating a radioactive gas from the column effluent, the dual function packed column of the invention has inherently broader application to other gases including rectification processes involving selected high purity products, such as argon, for example. That is, the concept makes it possible to tolerate off-specification performance of a system for a limited time, depending on the capacity of the adsorber, without affecting a fixed standard of purity for the product. During this interval, the cause of the malfunction can be corrected and the column will then restore itself by self-cleaning action to its original operative condition.

Summarizing, an upset or transient condition can be tolerated to a significantly higher degree without the selected high purity material going off-specification, or without any special treatment or operation following the upset. Also, where the selected material is a radioactive gas, the guard adsorber provides additional storage delay within the column.

The krypton in the mixture separated by cryogenic distillation at C-32 constitutes about 0.1% of the collected gas and drains from the primary column C-32 for collection in a reboiler RB-321 that functions as a thermo-syphon exchanger and also provides reboil for the distillation column. The collected mixture is accumulated in one of a pair of alternatively connected monitor tanks T-34 and T-35. It will therefore be seen that radioactive noble gases are rapidly and securely segregated from the main process stream, and that the inventory of radioactive gas in the primary separation column is minimized.

The monitor tanks are connected for alternate feed from the reboiler loop. Each tank is sized to contain the noble gas mixture that would be collected during a selected period of operation at maximum design flow. The off-stream tank which is isolated from the primary column, becomes the feed source for batch operation of the secondary separation column C-40, this column being essentially similar to that of the batch still C-41. The secondary column functions to concentrate the separated krypton into small volume for easy containment, transportation, and/or storage.

Each monitor tank is provided with a heater 60 for vaporizing the gas mixture when it is to be fed to the secondary column C-40. In this column, the vapor flows upwardly through a packed bed as indicated, in counterflow with reflux LQN. The reflux refrigeration is provided by the LQN-cooled condenser HE-401. Cold clean gas is effluent at the top of the column; the condensed concentrated krypton collects at the bottom 64 where it drains for compact storage into a reboiler tank RB-402 that is replaced as required and suitably stored.

For ensuring against release of even traces of radioactive gas, the effluent batch gas in outlet line 62 is reintroduced at the bottom of primary column C-32 where it again becomes part of the feed thereto. Thus, the concentration process takes place within a closed cycle thereby affording no release of radioactive gas to atmosphere. The invention by using both continuous and internal batch modes of cryogenic distillation according to respective advantages achieves optimum concentration of the radioactive gas, especially krypton, while avoiding more complex systems and yet lending itself to economical design.

The "clean" gas stream in the vent line 54 of the primary column C-32 now free of krypton and xenon, may nevertheless still contain some radioactivity due to short-lived nitrogen isotopes, such as N-13 and N-16. Any possible hazard due to these short-lived isotopes is avoided by providing suitable decay time, i.e. process delay, in the clean gas cycle. As the temperature of the clean gas from the primary column is about $-320°$ F, this gas can be economically used as a material part of the coolant in various cooling circuits to operate the system, thereby reducing the LQN standby refrigeration requirement, as well as providing the delay required before venting.

As shown in FIGS. 4 and 5, the cold nitrogen stream from line 54 is used successively to cool the freeze-out exchanger HE-31 and also through line 55, the warm feed exchangers HE-22A and B. The indicated alternate service lines to the warm feed exchangers each includes a heater HE-21A and B, respectively, that is selectively energized for de-icing the corresponding exchanger when off-stream.

After being warmed in the exchanger by heat from the incoming reactor off-gas stream in line 30, the decontaminated stream is initially fed by line 70 to a compressor generally indicated at CP-11. This compressor drives the gas through the recompression and recycle loop that includes in succession, a water cooled after-cooler HE-12, a recycle exchanger HE-39 for reducing the gas temperature to near liquefaction at its outlet line 72 leading to the reboiler RB-321. In the reboiler the gas gives up additional heat on the condensing side so that the nitrogen is liquefied, while the hydrogen and any other noncondensibles are separated and returned through line 74, the adsorber elution circuit, and batch still C-41, to the hydrogen recycle circuit of the recombiner, FIG. 2. This hydrogen-rich stream is primarily used to elute the adsorbed $CO_2$-Xe from the adsorber, and is then returned after $CO_2$ and Xe separation, etc. to the recombiner for recycling.

The liquid nitrogen stream from the reboiler RB-321 is collected in the nitrogen separator and delay tank SP-323 after passing through a "capillary" at 80 to reduce pressure and temperature. The separator and delay tank can be used to hold the nitrogen for a delay period sufficient to permit decay of short-lived nitrogen iostopes. This tank supplies liquid nitrogen from line 81 to refrigerate the primary separation column condenser HE-322; in addition, the boil-off $N_2$ gas in line 82 is used for cooling in the recycle exchanger HE-39, thereby conserving refrigeration.

The recycled gas sufficiently aged in the delay tank SP-323 to allow decay of both N-13 and N-16, flows as boil-off from the outlet line 82 to the recycle exchanger HE-39 (FIG. 4) as mentioned above, and to the waste gas compressor CP-16 where its pressure is increased to 2 psig. At this point, as much of the recycled gas as is necessary to maintain constant flow conditions in the cryogenic separation is allowed to re-enter the contaminated gas stream through a branch line 86, while any excess is vented by line 88 through the clean gas vent. Suitable control of the divided flow can be achieved according to standard practice by a flowmeter 90 in the incoming feed line 28 that controls through conventional means a valve 92 in the branch line 86. Accordingly, notwithstanding comparatively wide fluctuations in the incoming reactor off-gas, the system is adapted to operate continuously and at constant rate if desired, by recirculating a sufficient amount of the decontaminated nitrogen stream to compensate any decrease in flow of the incoming off-gas.

Figure 6:
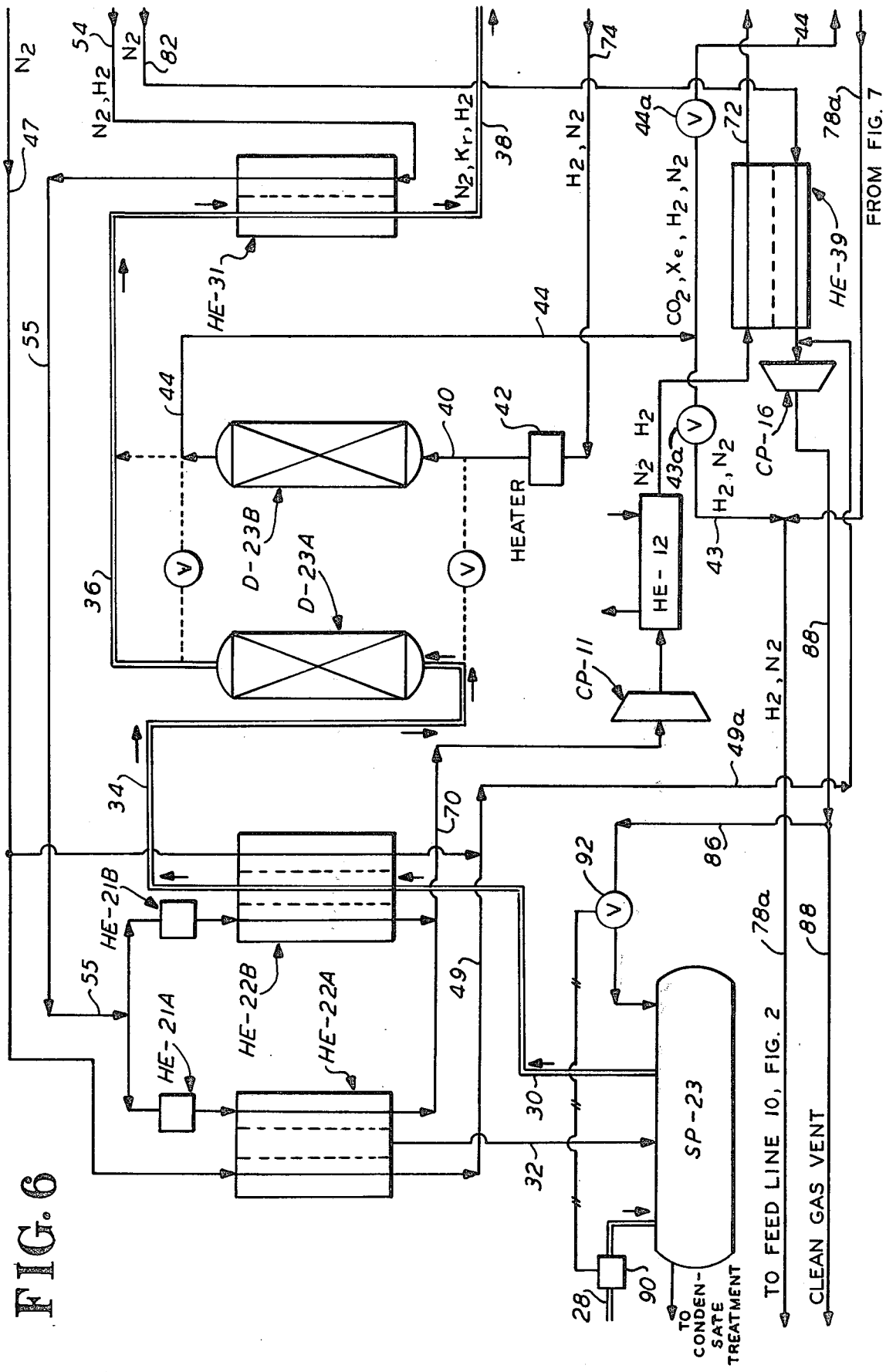
FIGS. 6 and 7 illustrate modifications of the apparatus and flow circuits of FIGS. 4 and 5.
Figure 7:
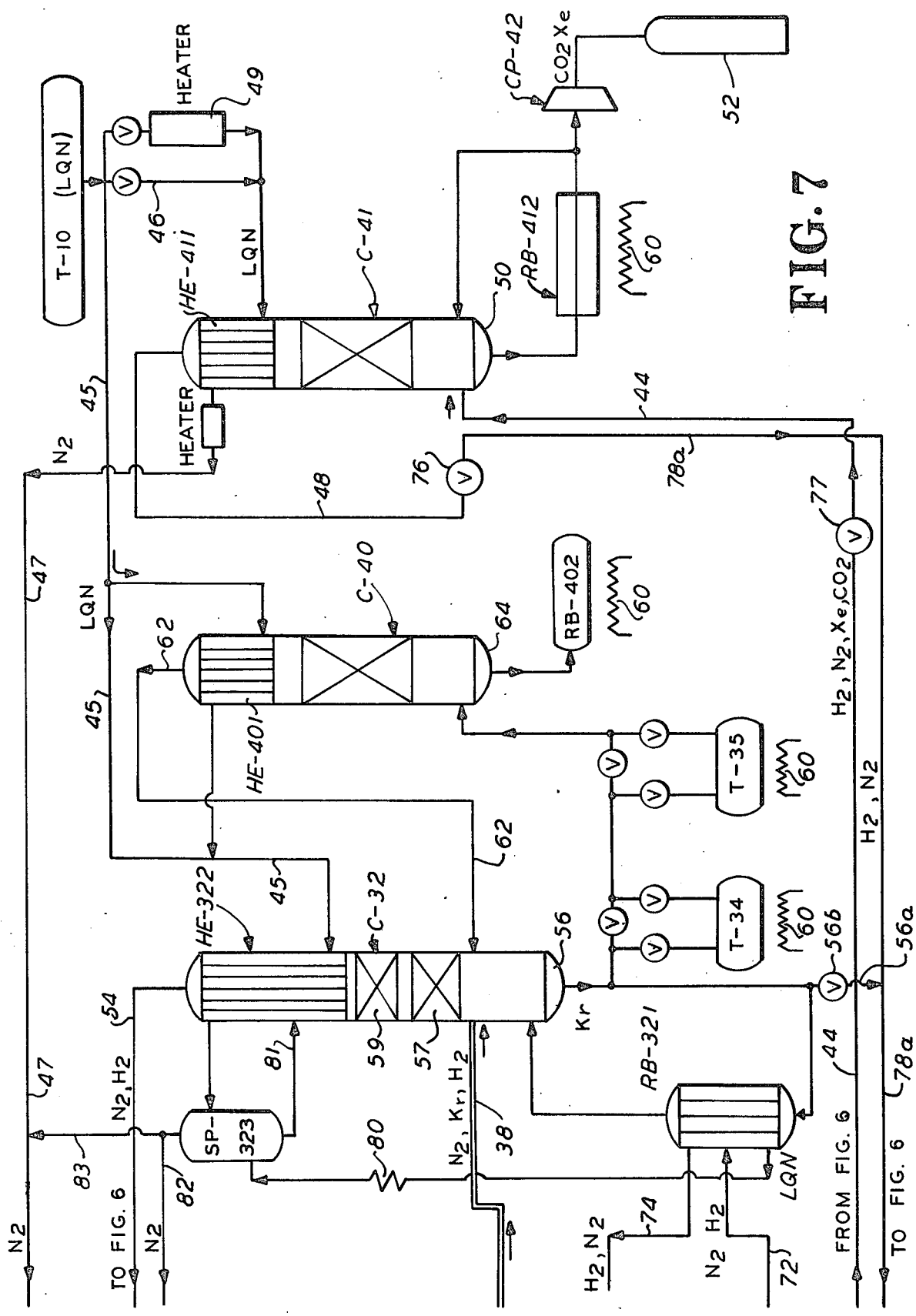

FIG. 6 and 7 disclose certain modifications of the circuits of FIGS. 4 and 5 for improving the efficiency and safety factor of the process described above. Referring first to FIG. 7, the primary distillation column C-32 is provided with condensate recycling for further protecting the column from any possible explosion hazard that might result from an unforeseen chance accumulation of $O_2$ in the condensate. A further reason for recycle is to enable elimination of the $H_2$ supply through valve 23 (FIG. 2) to the feed stream and to remove atmospheric oxygen from the concentrated condensate at 56. This may be accomplished by connecting a recombiner with a suitable $H_2$ supply between line 56a and monitor tank T-34. The foregoing modification enables a reduction in the gas feed required to be treated as $O_2$ previously recombined with $H_2$ (supplied through valve 23) may be combined in a smaller recombiner as described above.

In the embodiment illustrated in FIGS. 6 and 7, when $O_2$ is subjected to a concentrated radiation field such as might be produced by radioactive Kr in the bottom condensate at 56, the result is formation of ozone ($O_3$). This involves a high ignition risk. Although the two-step de-oxidizing action of the recombiner, FIG. 2, normally reduces the $O_2$ in the outlet stream of the second recombiner unit D-15 to a comparatively few parts per billion, thereby practically precluding any significant $O_2$ accumulation in the column C-32, an additional back-up safety factor is provided. This is accomplished in FIG. 7 by continuously bleeding off some of the condensate from the column at 56 through a bleed-line 56a into the hydrogen recycle line 78a. This line in the present instance is directly connected to the incoming off-gas feed line 10 by way of line 20 (FIG. 2), so that the condensate is subject to continuous recycling through the recombiner for removing all the $O_2$ and thereby precluding its build-up within the primary column C-32. The bleed line 56a is designed for restricted flow as desired, and may include an orifice or adjustable throttling valve 56b for example, for recycling the condensate at a predetermined flow rate.

FIG. 7 also shows a modification of the primary distillation column C-32 wherein the condensers HE-322 and HE-323 of FIG. 5 are combined in effect to make up a single unit, thereby simplifying the construction and cooling circuits. As shown in FIG. 7, the condenser HE-322 is made somewhat longer to constitute the single condenser unit. The cold LQN inlet line 45 is connected as shown to the lower part of the condenser and the delay tank SP-323 containing LQN is also connected thereto as in FIG. 5 for condenser cooling. The cold boil-off $N_2$ gas from the delay tank prior to venting is divided into two streams, one through the $N_2$ line 82 for cooling the recycle exchanger HE-39 as in FIG. 4, and the other through lines 83 and 47 for cooling the warm exchangers HE-22.

As the cold effluent from the primary column C-32 can be sufficient for operating the freeze-out exchanger HE-31, FIGS. 6 and 7, the exchanger can be simplified for two-pass construction, thereby reducing its cost and eliminating the additional cooling line from the primary column condenser, FIG. 5; also, for better utilizing the LQN supply, the exhaust flow of the secondary column condenser HE-401 is piped into the LQN line 45 for the primary column condenser HE-322. As pointed out above, the warm pass exchangers now have use of the cold boil-off from the delay tank SP-323 for cooling in addition to the waste $N_2$ from the condenser HE-411 of column C-41.

The now warmed $N_2$ from the warm pass exchangers HE-22 flows through lines 49 and 49a, FIG. 6, to the inlet of the vent line compressor CP-16 for venting from line 88 as clean gas. By this arrangement, the steam jet compressor of FIG. 4 is eliminated with resulting cost reduction in equipment and operation.

In FIG. 6, the eluting stream from the off-stream adsorber is shown as flowing directly through line 44 to the column C-41, FIG. 7, for freeze-out at condenser HE-411. If desired, the freeze-out condenser can comprise a separate unit, from which the Xe and $CO_2$ after vaporization are compressed and bottled as shown. In such case, the column C-41 can be used for recovering by distillation Kr traces in the bottled Xe.

Returning to FIG. 6, the eluting $N_2$, $H_2$ stream continues to flow through the off-stream adsorber after removal of Xe and $CO_2$ therefrom. The heater 42 is thereupon turned off so that the cold $N_2$, $H_2$ stream now refrigerates the adsorber for the next on-stream operation. During this refrigeration phase, the flow through the adsorber exhaust line 44 is diverted into line 43 by closing the valve 44a in line 44 and opening valve 43a in line 43. This directs the refrigerating exhaust gas into the $H_2$, $N_2$ recycle line 78a and hence back to the off-gas feed line. Thus, any traces of radioactive gases that may have been picked up in the adsorber during refrigeration are recycled within the system for eventual separation and isolation.

For simplicity of disclosure, instrumentation and control circuits for system valving, etc. are generally omitted except for a few typical examples indicated in FIGS. 2 and 4. It will be understood, of course, that automatic control of the disclosed system can be achieved as required according to standard industrial control practice.

In summary, the invention has a number of important and practical advantages over prior art systems, one of the more significant being the unusually high decontamination factor (DF) achieved by improved use of distillation columns. This high DF is the result of the system's ability to pick up all traces of the radioactive gases, especially krypton, by recycling for redistillation even slightly contaminated streams. Improved plant design resides in the long system operating cycle (with corresponding delay time), together with a small and compact delay space for the activation gases, and plant efficiency is increased by the unattended, self-regulating operation for achieving constant flow of the process stream. Finally, an important safety factor is the practical elimination of hazardous materials, such as oxides of nitrogen and oxygen in the initial stages of the operation.

Having set forth the invention in what is considered to be the best embodiment thereof, it will be understood that changes may be made in the system and apparatus as above set forth without departing from the spirit of the invention or exceeding the scope thereof as defined in the following claims.

I claim:

1. In a process for removing radioactive krypton and xenon from a gaseous feed stream that consists mainly of air and radiolytic hydrogen and oxygen, the method which comprises:
   a. initially removing oxygen by catalytic reaction from the feed stream;
   b. directing the oxygen-free stream through adsorber means for removing xenon and also carbon dioxide therefrom;
   c. feeding the remainder of the stream including hydrogen, nitrogen, and the radioactive krypton to a first cryogenic distillation column for separating and liquefying the krypton;
   d. feeding the separated krypton to a second cryogenic distillation column for concentrating the krypton therein;
   e. returning the effluent gas from the second column to the inlet of the first column for concentrating all the krypton within a closed loop;
   f. collecting the concentrated krypton from the second column for storage, and
   g. eluting the xenon together with the carbon dioxide from the adsorber means by distillation effluent gas from one of said columns and separating the xenon and carbon dioxide from the effluent for storage, and returning the eluted gas to be reprocessed to prevent loss of radioactive gases.

2. The method as specified in claim 1 wherein the eluting gas is effluent from the first distillation column.

3. The method as specified in claim 1 wherein the liquefied krypton in the first column is batch-collected and subsequently fed in alternate batches to the second column for further concentration.

4. The method as specified in claim 1 wherein nitrogen in the feed stream is liquefied, collected and held for a time sufficient for the decay to an insignificant level of radioactive nitrogen isotopes.

5. The method as specified in claim 4 wherein the held nitrogen is vaporized after elapse of time sufficient for the decay to an insignificant level of radioactive nitrogen isotopes, and the vaporized stream is divided, respectively, for venting and for recirculation to the feed stream for maintaining uniform system flow.

6. The method as specified in claim 1 wherein the oxygen is removed from the feed stream by the catalytic reaction in which hydrogen is added to form water, and withdrawing the water.

7. The method as specified in claim 6 wherein hydrogen constituting part of the distillation effluent is recycled to the feed stream to supplement the hydrogen added for catalytic reaction.

8. The method as specified in claim 7 wherein the reaction consists of first and second reactions in series in the feed stream, and hydrogen is initially added to the feed stream for the first reaction, and the effluent hydrogen is added for the second reaction.

9. The method as specified in claim 7 wherein effluent nitrogen and hydrogen from the first column are initially used for cooling the feed stream and subsequently pressurized and cooled to condense nitrogen and form a hydrogen-rich stream which in turn is used to transfer the adsorbed carbon dioxide and xenon from the adsorber means.

10. The method as specified in claim 1 wherein the carbon dioxide and xenon are concurrently adsorbed in an adsorber having an operating temperature at least as low as $-100°$ F for ready adsorption of carbon dioxide.

11. The method as specified in claim 10 wherein said adsorber comprises a molecular sieve.

12. The method as specified in claim 10 wherein the adsorbed carbon dioxide and xenon are eluted from said adsorber and transferred by the effluent gas to a freeze-out and separation system.

13. The method as specified in claim 1 wherein the carbon dioxide and xenon are transferred after adsorption to a freezeout condenser by the eluting effluent for subsequent vaporization, compression and storage.

14. The method as specified in claim 13 wherein the eluting effluent is from the first distillation column and the carbon dioxide and xenon are jointly vaporized after freeze-out and compressed and bottled for storage.

15. The method as specified in claim 13 wherein the remaining eluting stream after freeze-out of xenon and carbon dioxide is recycled back to the gaseous feed stream.

16. The method as specified in claim 1 wherein the first column has a back-up guard adsorber for removing krypton from the effluent gas prior to its flow from the column.

17. The method as specified in claim 1 wherein a minor part of the krypton-nitrogen condensate from the first distillation column is recycled back into the feed stream for further catalytic reaction.

18. In a process for removing radioactive gases krypton and xenon from a stream of off-gas including air from a nuclear reactor, the method which comprises:
   a. initially removing oxygen from the stream by catalytic reaction to form water, and withdrawing the water;
   b. cooling the oxygen-free stream and removing both carbon dioxide and xenon from the stream by adsorption;
   c. cooling the remainder of the stream in a freezeout condenser and feeding the cooled stream to a first cryogenic distillation column for liquefying the krypton within the column;
   d. batch storing the liquefied krypton;
   e. feeding the stored batches of krypton in succession to a second cryogenic distillation column for further concentration of krypton;
   f. returning effluent gas from the second column to the inlet of the first column for recycling of krypton traces;
   g. collecting from the second column concentrated krypton for storage;
   h. and collecting for storage the adsorbed carbon dioxide and xenon by an eluting stream of effluent from the first column.

19. In a process for removing radioactive krypton and xenon from a gaseous feed stream that consists mainly of air and radiolytic hydrogen and oxygen, the method which comprises:
   a. initially removing radiolytic oxygen by catalytic reaction from the feed stream;

b. directing the stream containing atmospheric oxygen and nitrogen through adsorber means for removing xenon and carbon dioxide therefrom;
c. feeding the remainder of the stream including hydrogen, radioactive krypton and atmospheric oxygen and nitrogen to a first cryogenic distillation column for separating and liquefying the krypton and oxygen;
d. combining said separated oxygen with hydrogen to form water and subsequently removing said water;
e. feeding the separated krypton to a second cryogenic distillation column for concentrating the krypton therein;
f. returning the effluent gas from the second column to the inlet of the first column for concentrating all the krypton within a closed loop;
g. collecting the concentrated krypton from the second column for storage;
h. eluting the xenon together with the carbon dioxide from the adsorber means by distillation effluent gas from one of said columns and separating the xenon and carbon dioxide from the effluent for storage, and
i. returning the eluted gas to be reprocessed to prevent loss of radioactive gas.

* * * * *